United States Patent [19]

McIntire et al.

[11] 4,327,676

[45] May 4, 1982

[54] METHOD AND APPARATUS FOR A LOW EMISSION DIESEL ENGINE

[76] Inventors: Ray G. McIntire, 896 Black Foot Trail, Jamestown, Ohio 45335; Douglas Colvette, 912-4 LaCosta, Sarasota, Fla. 33577

[21] Appl. No.: 126,769

[22] Filed: Mar. 3, 1980

[51] Int. Cl.³ .............................................. F01L 1/08
[52] U.S. Cl. .................................. 123/90.6; 123/90.16
[58] Field of Search ......................... 123/90.16, 90.60

[56] References Cited

U.S. PATENT DOCUMENTS

| | | | |
|---|---|---|---|
| 1,501,041 | 7/1924 | Cutler ................................. | 123/90.16 |
| 2,780,912 | 2/1957 | Miller ................................. | 123/90.16 |
| 2,997,991 | 8/1961 | Roan ................................... | 123/90.16 |
| 3,144,009 | 8/1964 | Goodfellow et al. . | |
| 3,166,057 | 1/1965 | Konrad et al. . | |
| 3,441,009 | 4/1969 | Rafanelli . | |
| 3,714,932 | 2/1973 | Meacham et al. . | |
| 3,786,792 | 1/1974 | Pellizzoni et al. . | |
| 4,143,629 | 3/1979 | Goloff et al. ....................... | 123/90.16 |
| 4,157,080 | 6/1979 | Hill . | |

FOREIGN PATENT DOCUMENTS

| | | | |
|---|---|---|---|
| 1529537 | 5/1968 | France . | |
| 2158942 | 6/1973 | France . | |
| 2271388 | 12/1975 | France ................................. | 123/90.6 |

OTHER PUBLICATIONS

*The Internal Combustion Engine in Theory and Practice,* vol. 1, M.I.T. Press, Mass., 1966, pp. 188-193.

*Primary Examiner*—Craig R. Feinberg
*Assistant Examiner*—W. R. Wolfe
*Attorney, Agent, or Firm*—Biebel, French & Nauman

[57] ABSTRACT

An improved method and apparatus four operating a high-speed four cycle compression ignition engine cause the amount of $NO_x$ in the exhaust gases to be reduced substantially. The improved method of operating the high-speed for cycle compression ignition engine is of the type wherein fresh working fluid is introduced through an intake valve, the working fluid is compressed, fuel is injected and burns thereby expanding the working fluid, and the working fluid is scavenged through an exhaust valve, the improvement comprising timing the opening of the intake valve and the closing of the exhaust valve so that no fresh working fluid is permitted to pass out the exhaust valve.

The timing of the opening of the intake valve and the closing of the exhaust valve is achieved by adjusting the contours and the relative positions of the valve cams on the cam shaft of the engine.

5 Claims, 9 Drawing Figures

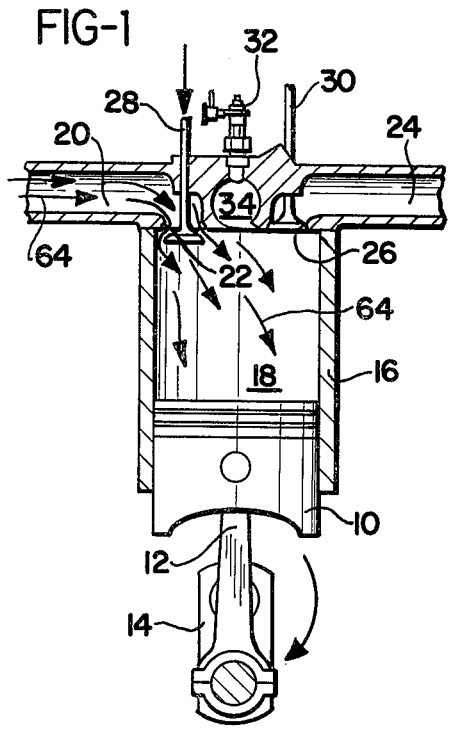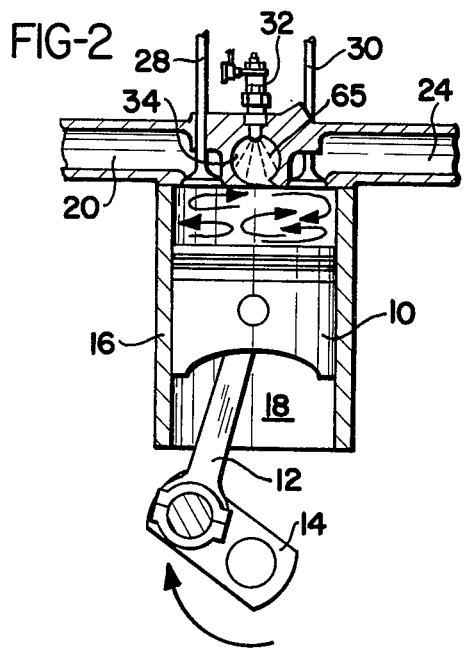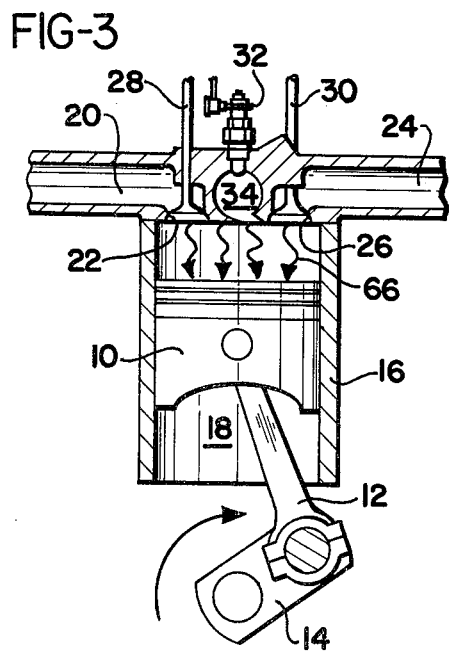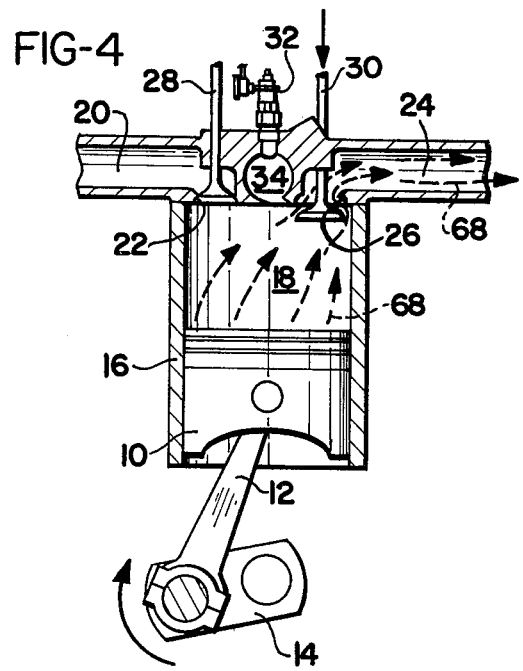

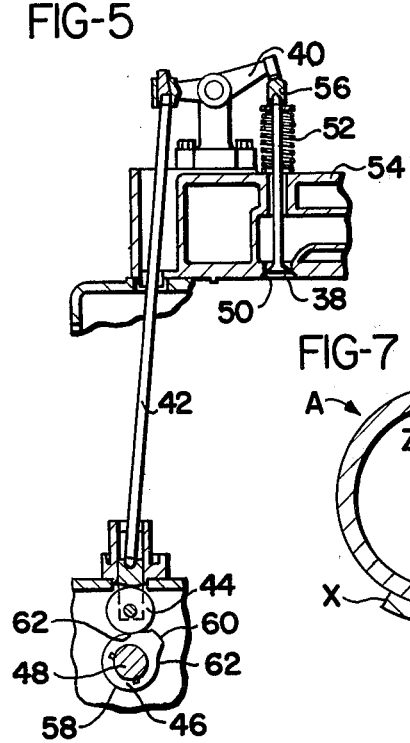
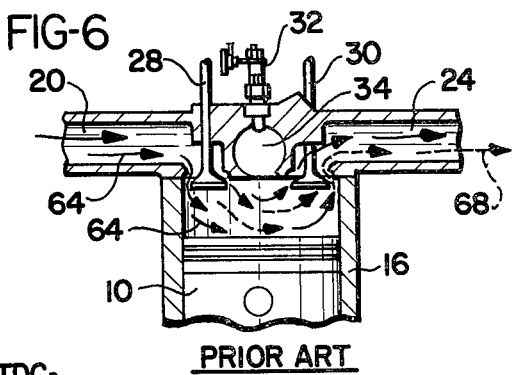
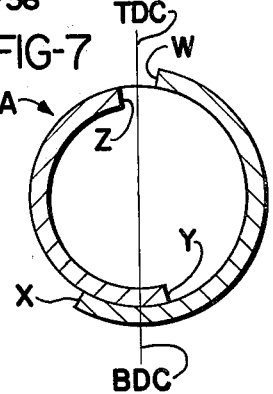
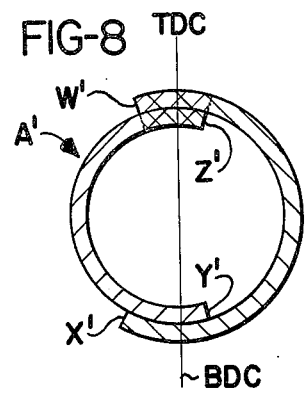
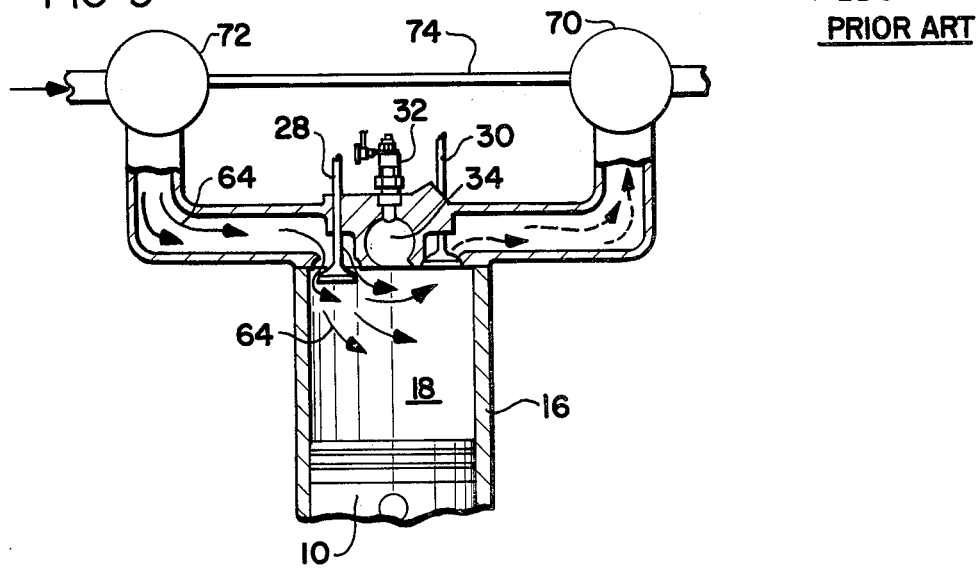

METHOD AND APPARATUS FOR A LOW EMISSION DIESEL ENGINE

BACKGROUND OF THE INVENTION

1. Field of the Invention

This invention relates to compression ignition engines and in particular to the operation of high-speed compression ignition engines in such manner as to reduce the amounts of oxides of nitrogen in the exhaust gases.

2. Prior Art

As result of increasingly stringent federal standards with respect to emmissions from automobile exhausts, alternative power plants for automobiles are being investigated. One popular alternative power plant is the compression ignition engine, commonly known as the Diesel engine.

The Diesel engine has several advantages over conventional spark ignition engines. In particular, Diesel engines burn heavier fuel which is cheaper than gasoline, they have a higher thermal efficiency than spark ignition engines, and they have significantly lower emmissions in some respects than comparable spark ignition engines. While carbon monoxide emmissions are low because the Diesel engine operates with excess air, and hydrocarbons are normally a small constituent of Diesel exhaust, Diesel engines characteristically produce unacceptably high amounts of oxides of nitrogen ($NO_x$) and therefore are presently unable to meet government standards with respect to $NO_x$ emmissions for automobiles.

The standard Diesel engine used in some automobiles and most trucks today is a four-stroke or four cycle engine. In the first or intake stroke, the intake valve opens and the piston decends to draw fresh air into the cylinder. In the second or compression stroke, the intake valve closes and the piston rises to compress the air which becomes heated. At the end of the compression stroke, fuel is injected into the cylinder and burns.

In the third or expansion stroke, the burning mixture expands and forces the piston down. At this time both the intake and the exhaust valves are closed.

In the fourth or exhaust stroke, the exhaust valve opens and the burned gases are forced out of the cylinder by the rising piston.

Since the working fluid, namely air, is a compressible gas that enters and leaves the cylinder in more than an instantaneous period of time, the closing of the exhaust valve at the end of the exhaust stroke typically occurs subsequent to the opening of the intake valve at the beginning of the air intake stroke. In other words, the exhaust valve remains open until after the piston reaches top dead center, and the intake valve opens before the piston reaches top center. The reason for this "valve overlap" is to effect a more thorough scavenging of the exhaust gases from the cylinder, which brings about an increase in power out of proportion to the amount of air involved.

When the exhaust stroke begins and the exhaust valve opens, the motion of the exhaust gases is started by the cylinder pressure existing when the exhaust valve is opened and is promoted by the piston motion during the exhaust stroke. The scavenging of exhaust gases tends to continue during and after the top center period. Therefore, the intake valve is opened to allow fresh air to enter the cylinder to displace the last traces of exhaust gases in the cylinder and a necessary result of this procedure is that a certain amount of fresh air is drawn through the cylinder and out past the exhaust valve where it mixes with the exhaust gases.

It is believed that the occurrence of this valve overlap, during which fresh air is drawn in through the intake valve and out through the exhaust valve, is a major cause of the formation of unacceptable amounts of $NO_x$ in the exhaust gas of a Diesel engine.

SUMMARY OF THE INVENTION

The present invention provides an improved method and apparatus for operating a high-speed, four cycle, compression ignition engine in which the valve timing is adjusted so that the exhaust valve is completely closed prior to the time the piston reaches top dead center and the intake valve opens after the piston passes top dead center so that no fresh air is permitted to pass out the exhaust valve. Some exhaust gases may remain in the cylinder at the beginning of the next cycle. In this fashion, the conditions which create unacceptably high amounts of $NO_x$ in the exhaust gases are reduced without a significant reduction in the effective horsepower or mileage.

The aforementioned timing of the valves is achieved by adjusting the relative positions of the cams actuating the intake and exhaust valves relative to one another as well as the contour of the flank and nose portions of the cam. Although there are virtually an infinite number of possible combinations of cam contours and relative cam combinations, the desired effect is to close the exhaust valve completely at the end of the exhaust stroke before the intake valve opens at the beginning of the air intake stroke.

Although the method of the present invention will reduce significantly the presence of $NO_x$ in the exhaust gases of all high-speed compression ignition engines, the results are most noticeable in those compression ignition engines equipped with a turbocharger. It is believed that a turbocharged Diesel engine is particularly suitable for the method of the present invention since, with a turbocharged Diesel engine, an even greater amount of fresh air passes out the exhaust port if the valves are timed so that there is valve overlap at the end of the exhaust stroke and the beginning of the air intake stroke.

Accordingly, it is an object of this invention to provide an improved method of operating a high-speed four stroke compression ignition engine in which the amount of $NO_x$ present in the exhaust gases is at an acceptable level without an appreciable decrease in horsepower generated or fuel efficiency.

Other objects and advantages of the invention will be apparent from the following description, the accompanying drawings, and the appended claims.

BRIEF DESCRIPTION OF THE DRAWINGS

FIG. 1 is a side elevation in section of the invention during the intake stroke;

FIG. 2 is a side elevation in section of the invention during the compression stroke;

FIG. 3 is a side elevation in section of the invention during the combustion or expansion stroke;

FIG. 4 is a side elevation in section of the invention during the scavenging or exhaust stroke;

FIG. 5 is a partial side elevation in section of the cam and valve assembly of the invention;

FIG. 6 is a side elevation in section of a prior art compression ignition engine at the end of the exhaust stroke and the beginning of the intake stroke;

FIG. 7 is a valve timing diagram of the present invention;

FIG. 8 is a valve timing diagram of a prior art compression ignition engine; and FIG. 9 is a side elevation in section showing a turbocharger schematically.

DETAILED DESCRIPTION OF THE PREFERRED EMBODIMENT

As shown in FIGS. 1 through 4, the method and apparatus of the present invention can be integrated into a standard, high-speed, four stroke, compression ignition engine. The power generating portion of such engines typically consists of a piston 10 which is pivotally connected to a piston rod 12 mounted on a crankshaft 14 which transmits the piston movement to a drive train (not shown). The piston 10 reciprocates within a cylinder 16 that defines a combustion chamber 18 which communicates with an intake manifold 20 by means of an inlet port 22 and an exhaust manifold 24 through an exhaust port 26. The inlet and exhaust ports 22, 26 are shaped to receive intake and exhaust valves 28, 30 respectively, which can be moved to open and close passages in the inlet and exhaust ports.

A fuel injection nozzle 32, which is connected to a fuel source (not shown), communicates with a pre-combustion chamber 34. The pre-combustion chamber 34 in turn communicates with the combustion chamber 18.

As shown in FIG. 5, a typical valve 38 in a compression ignition engine pivots against a rocker arm 40 in which is pivotally journaled a push rod 42. The push rod 42 terminates in a cam follower 44 which rolls against a cam 46 which is fixedly journaled to the camshaft 48. The camshaft 48 is turned by the crankshaft 14 by means of a linkage (not shown) well-known in the art. As the camshaft 48 rotates, the eccentricity of the cam shape causes the cam follower 44 to rise and fall thereby causing the valve 38 to engage and disengage a typical port 50. The valve 38 is urged against the port by means of a spring 52 which urges against the engine block 54 and the terminal portion 56 of the valve 38.

The timing of the opening and closing of the intake and exhaust valves 28, 30 is a function not only of the positions of their respective cams 46 in relation to one another on the camshaft 48 but also of the cam contour. The cam contour is comprised of a base circle portion 58, a nose 60, and two flanks 62. The shapes of the flanks 62 and the nose 60 of a cam 46 determined the rate at which each valve is opened and the duration that it remains open.

The method of operating the Diesel engine of the present invention is as follows. As shown in FIG. 1, the crankshaft 14 may turn in a clockwise direction, drawing the piston 10 downward within the cylinder 16, and at the same time, the intake valve 28 is moved away from the inlet port 22, thus allowing fresh air 64 from the intake manifold 20 to be drawn into the cylinder. This process begins when the piston is approximately 1° to 3° past top dead center, that is, when the crankshaft 14 has turned 1° to 3° beyond the position it was in at the time the piston 10 reached its maximum ascent within the cylinder 16. The intake valve 28 remains open until the piston 10 has reached approximately 30° past bottom dead center, that is, the crankshaft 14 has turned 30° beyond the position it was in at the time the piston 10 reached its furthest decent within the cylinder 16.

As shown in FIG. 2, the compression stroke begins with the closing of the intake valve 28 and the travel of the piston 10 upward within the cylinder 16. As the air 64 is compressed within the cylinder 16, it becomes hotter.

When the piston 10 is near top dead center a charge of fuel 65 is injected through the nozzle 32 as a fine spray into the hot air 64, and ignition takes place. As shown in FIG. 3, the expanding gases 66 force the piston 10 downward on the third stroke of the cycle, and the movement of the piston is transmitted to the crankshaft 14 by the piston rod 12.

As shown in FIG. 4, the exhaust valve 30 opens when the piston 10 is approximately 30° before bottom dead center, and the scavenging or exhaust stroke begins. The piston 10 reaches bottom dead center and begins its ascent up the cylinder 16 to force the exhaust gases 68 out through the exhaust port 26 and the exhaust manifold 24. When the piston 10 is near top dead center, the exhaust valve 30 closes the exhaust port 26 completely, thereby cutting off the flow of exhaust gases 68 through the port trapping a small amount of exhaust gas within the cylinder 16. As the piston 10 passes top dead center and begins the first or intake stroke, the intake valve 28 opens the inlet port 22, and fresh air 64 is admitted. Thus, in the method of the present invention, a small amount of exhaust gas 68 may remain in the cylinder, and no fresh air 64 is permitted to "blow by" and mix with the exhaust gases in the exhaust manifold 24.

The foregoing explanation of the method and apparatus of the present invention and the accompanying Figures are contrasted with the operation of a conventional Diesel engine of the prior art as shown in FIG. 6. FIG. 6 depicts the position of the piston 10, intake valve 28 and exhaust valve 30 at the end of the exhaust stroke and the beginning of the intake stroke.

In the operation of Diesel engine of the prior art, both valves 28, 30 are open at this time to allow fresh air 64 to enter the combustion chamber 18, thereby completely scavenging the exhaust gases 68 from the combustion chamber. However, a certain amount of "blow by" occurs wherein fresh air 64 passes into the combustion chamber 18 and out the exhaust port 26 without supporting the combustion of the fuel. In order to reduce significantly the presence of unacceptable levels of $NO_x$ in the exhaust gases of the engine of the present invention, the prior art configuration depicted in FIG. 6 does not occur at any time during the operation of the Diesel engine of the present invention.

FIG. 7 shows a valve timing diagram for the operation of a Diesel engine of the present invention. The circle, generally designated A, can be considered as the path traced by a point positioned on the crankshaft 14 of the present invention. The line segment TDC represents the position of the crankshaft 14—and hence the piston 10—at top dead center, that is, when the piston has risen to its highest point in the cylinder 16. The line segment BDC represents the position of the crankshaft 14 and piston 10 and bottom dead center, that is, the point at which the piston has reached its furthest descent within the cylinder 16.

Thus, to depict the valve sequence for a Diesel engine of the present invention, the piston begins at a point TDC on the valve diagram and begins to descend as the crankshaft turns in a clockwise manner. The inlet valve opens at line segment W which represents a cylinder position approximately 3° after top dead center, and remains open to line segment X approximately 30° after bottom dead center. The area bounded by lines W and X represents the period of time during the first cycle when the intake valve 28 is open.

Line X also designates the beginning of the second or compression stroke. This stroke continues to a point near top dead center at which time the fuel is sprayed into the combustion chamber 18 through the nozzle 32 and the expansion stroke begins. During the expansion stroke, the crankshaft 14 is turning from line TDC to line Y, located within circle A. Line Y denotes the opening of the exhaust valve 30 and the beginning of the exhaust stroke shown in FIG. 4.

The exhaust stroke begins at approximately 30° before bottom dead center and continues to a point denoted by line Z which is approximately 3° before top dead center. Line segment Z denotes the point at which the exhaust valve is completely closed. The segment of the timing cycle between lines Z and W represents a period of crankshaft rotation during which both the intake valve 28 and the exhaust valve 30 are closed. It is crucial to the operation of a Diesel engine according to the present invention that this segment appear on the valve timing sequence.

In contrast, a valve timing diagram of a Diesel engine operated according to the method of prior art is shown as circle A' in FIG. 8. The start of the first or intake stroke is shown by line segment W' which occurs before top dead center. The intake valve 28 remains open until segment X', typically about 25° past bottom dead center. The compression stroke begins at line X' with the closing of the intake valve 28 and continues through to a point near top dead center at which time the fuel is sprayed into the combustion chamber 18 from the nozzle 32 and the third or expansion stroke begins.

The expansion stroke continues through to line segment W', located within the circle A'. Line Y' denotes the opening of the exhaust valve 30 and the beginning of the exhaust stroke. The exhaust stroke continues through to a point Z', typically after top dead center.

Thus, the segment of the valve timing diagram of FIG. 8 denoted by the double cross-hatching represents the time during the four stroke cycle of the prior art in which both the intake and the exhaust valves 28, 30 are open, as shown in FIG. 6. It is at this time that fresh air 64 enters the combustion chamber 18 as the exhaust gases 68 are leaving the combustion chamber 18, and some fraction of the fresh air 64 leaves the cylinder along with the exhaust gases 68. By eliminating the time during which both the intake valve 28 and the exhast valve 30 are open, "blow by" of fresh air 64 entering the combustion chamber 18 is prevented, and the amount of $NO_x$ formed in the exhaust gases 68 is reduced.

The method and apparatus of the present invention are particularly effective when used in conjunction with a turbocharged Diesel engine as shown in FIG. 9. An exhaust turbine 70 located in the exhaust manifold 24 is driven by the exhaust gases 68 leaving the combustion chamber 18 during the exhaust stroke. The exhaust turbine 70 is coupled to an inlet turbine 72 by a drive shaft 74, and the inlet turbine is rotated by the exhaust turbine 70 to force fresh air 64 into the combustion chamber 18 during the air intake stroke. The result is that a much greater amount of fresh air 64 is present in the combustion chamber 18 during the operation of the engine, and consequently more fuel can be injected and a greater horsepower generated for a given cylinder.

Since higher pressures are involved, there is a greater amount of blow by of fresh air 64 in the operation of a prior art Diesel. The elimination of valve overlap eliminates all blow by and thereby reduces significantly the amount of $NO_x$ in the exhaust gases 68.

In accordance with the above discussion, Tables 1 and 2 show the effect of variations in valve overlap on the amount of $NO_x$ present in the exhaust gases of a turbocharged Diesel engine. The testing equipment and procedures used in generating this data were capable of duplicating the City and Highway Modes of the Federal Test Procedures as outlined in Part 86 of Chapter 1, Title 40 of the Code of Federal Regulations as applicable to light-duty vehicles. The testing facility at which the tests were performed was one of ten such facilities in the country listed by the U.S. Environmental Protection Agency as being equipped to perform emmission tests in accordance with the aforementioned federal procedures.

Three different cam designs yielding three different amounts of valve overlap were tested in a standard turbocharged Diesel engine mounted in one of two light-duty vehicles. All tests were run in accordance with the 1975 Federal Test Procedure. In this Federal Test Procedure, the vehicle to be tested was placed on a dynamometer set at predetermined resistance to simulate wind and rolling friction, and its exhaust gases were sampled while the vehicle was put through a series of accelerations, decelerations, and idle periods in a way designed to simulate actual driving conditions. The results for the entire test were reported in terms of grams of a particular pollutant per mile of vehicle operation on the dynamometer.

TABLE 1

| TEST NO. | ENGINE TYPE | VALVE OVERLAP (Degrees) | $NO_x$ (gm/mi) |
|---|---|---|---|
| 1. | Turbocharged Diesel | +10 | 9.65 |
| 2. | Turbocharged Diesel | +1 to +3 | 2.35 |
| 3. | Turbocharged Diesel | −1 to −3 | 1.85 |

TABLE 2

| TEST NO. | ENGINE TYPE | VALVE OVERLAP (Degrees) | $NO_x$ (gm/mi) |
|---|---|---|---|
| 4. | Turbocharged Diesel | +10 | 6.35 |
| 5. | Turbocharged Diesel | +1 to +3 | 1.94 |
| 6. | Turbocharged Diesel | −1 to −3 | 1.86 |

Table 1 shows the data generated by the vehicles which were put through a total of three Federal City Mode tests, each time with a cam design yielding a different degree of valve overlap.

In Test 1, a van having a standard, unmodified, turbocharged Diesel of a type exemplifying a prior art engine was tested. The amount of valve overlap, that is, the range of crankshaft angles during which both the inlet valve and the outlet valve were open (see FIGS. 6 and 8), was approximately 10°. The amount of $NO_x$ generated for the entire Federal City Mode was 9.65 gm/mi.

In Test 2, a pick-up truck having a turbocharged Diesel engine whose cams had been modified so that the valve overlap was reduced to approximately a 1° to 3°. The amount of $NO_x$ present in the exhaust gases for the City Mode was 2.35 gm/mi.

In Test 3, a pick-up truck having a turbocharged Diesel engine whose cam had been modified in accordance with the present invention was tested. The amount of valve overlap in this test was approximately a $-1°$ to $-3°$. The amount of $NO_x$ generated was approximately 1.85 gm/mi. Clearly, a turbocharged Diesel engine whose cam has been modified in accordance with the present invention displays a significant decrease in the amount of $NO_x$ generated in the exhaust gas during normal use.

Similarly, Table 2 depicts the same three vehicle and engine combinations subjected to the Federal Highway Mode on the same test facilities described above. The data from tests 4, 5, and 6 show that a modification of the engine to affect a negative valve overlap results in a significant decrease in the amount of $NO_x$ in the exhaust gases.

Although the method and apparatus of the present invention has been discussed as used with a Diesel engine having a precombustion chamber 34, the present invention will reduce $NO_x$ when integrated into a Diesel engine in which fuel is injected directly into the combustion chamber 18.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An improved method of operating a high-speed four-cycle automotive compression ignition engine of the type wherein an intake manifold receives fresh air from ambient air, intake valve means associated with the intake manifold is intermittently opened and closed so that amounts of fresh air flow from the intake manifold to a cylinder defining a combustion chamber, the fresh air is mixed with fuel and the mixture is burned within the combustion chamber thereby expanding to urge a piston to rotate a crankshaft, exhaust valve means communicating with the combustion chamber is intermittently opened and closed such that exhaust gases are exhausted from the combustion chamber, and a camshaft, communicating with the intake and exhaust valve means by linkage means, is rotated to actuate the intake and exhaust valve means, the improvement comprising the steps of:

forcing fresh air into the intake manifold until fresh air within the combustion chamber reaches a pressure above ambient pressure; and timing the opening of the inlet valve means and the closing of the exhaust valve means such that the exhaust valve means is fully closed for between 1° and 6° of crankshaft rotation before the inlet valve means is opened throughout the entire range of engine speeds to prevent fresh air from flowing directly from the inlet valve means through the exhaust valve means.

2. The method of claim 1 wherein the forcing step includes operating a turbocharger associated with the intake manifold to force fresh air into the intake manifold.

3. An improved high-speed, four-cycle automotive compression ignition engine of the type having at least one cylinder defining a combustion chamber and having a reciprocating piston therein linked to rotate a crankshaft; an intake manifold having inlet valve means communicating with the combustion chamber, exhaust valve means communicating with the combustion chamber, and camshaft and linkage means for intermittently opening and closing the intake valve means and the exhaust valve means such that fresh air may be drawn into the combustion chamber from the intake manifold through the intake valve means, and exhaust gases may be exhausted from the combustion chamber through the exhaust valve means, the improvement comprising:

means for forcing fresh air into the intake manifold such that fresh air in the combustion chamber has a pressure above ambient pressure; and means associated with the camshaft and linkage means for timing the opening of the intake valve means and the closing of the exhaust valve means such that the exhaust valve means is fully closed for between 1° and 6° of crankshaft rotation before the inlet valve means is opened throughout the entire range of engine speeds to prevent fresh air flow flowing directly from the inlet valve means through the exhaust valve means.

4. The engine of claim 3 wherein the timing means comprises a camshaft having cams shaped and positioned thereon such that the exhaust valve means is fully closed before the intake valve means is opened throughout the entire range of engine speeds.

5. The engine of claims 3 or 4 wherein the forcing means includes a turbocharger associated with the inlet manifold.

* * * * *